United States Patent [19]

Shinada

[11] Patent Number: 5,566,144
[45] Date of Patent: Oct. 15, 1996

[54] RECORDING/REPRODUCING APPARATUS HAVING BUFFER MEMORY FOR PREVENTING DISCONTINUITY IN RECORDING/REPRODUCING OPERATIONS AND METHOD FOR SAME

[75] Inventor: Akira Shinada, Kanagawa, Japan

[73] Assignee: Sony Corporation, Tokyo, Japan

[21] Appl. No.: 405,757

[22] Filed: Mar. 20, 1995

Related U.S. Application Data

[62] Division of Ser. No. 271,431, Jul. 7, 1994, Pat. No. 5,436,875.

[30] Foreign Application Priority Data

Jul. 13, 1993 [JP] Japan ..................... 5-196971
May 20, 1994 [JP] Japan ..................... 6-131073

[51] Int. Cl.⁶ ........................... G11B 17/22
[52] U.S. Cl. .................. 369/32; 369/59; 369/47
[58] Field of Search ................ 369/32, 59, 47, 369/124, 48, 13, 54, 58, 33, 50, 45; 360/10.1, 10.3, 19.1, 59, 114; 358/341, 342, 343

[56] References Cited

U.S. PATENT DOCUMENTS 4,075,665  2/1978  Borne et al. .................. 360/8
4,796,123  1/1989  Takeuchi et al. ............. 360/10.1
4,796,247  1/1989  Volgelsang .................... 369/44
5,034,827  7/1991  Fukatsu et al. ............... 360/10.3
5,070,419  12/1991 Kiyonaga ...................... 360/72.2
5,214,631  5/1993  Maeda et al. ................. 369/59
5,325,347  6/1994  Sako ........................... 369/48
5,343,452  8/1994  Maeda et al. ................. 369/32
5,343,456  8/1994  Maeda ......................... 369/59
5,436,875  7/1995  Shinada ....................... 369/32

FOREIGN PATENT DOCUMENTS

0155970A1  10/1985  European Pat. Off. .......... G11B 5/09
0196590A3  10/1986  European Pat. Off. ......... G11B 11/10
0283727A2  9/1988   European Pat. Off. ......... G11B 10/10
0429139A1  5/1991   European Pat. Off. .......... G11B 7/00
1560494    2/1980   United Kingdom ............ G11B 25/04
2136192    9/1984   United Kingdom ............. G11B 7/00

Primary Examiner—Ali Neyzari
Attorney, Agent, or Firm—Limbach & Limbach LLP

[57] ABSTRACT

A method and apparatus for alternately reproducing data from first and second recording media in which data from a first recording medium is reproduced and stored in a first memory until the amount of data accumulated in the first memory reaches a predetermined value. Then, the data reading operation from the first recording medium is stopped and, simultaneously, a second recording medium is exchanged for the first recording medium and data reproduction from the second recording medium commences, the data being stored in a second memory.

17 Claims, 14 Drawing Sheets

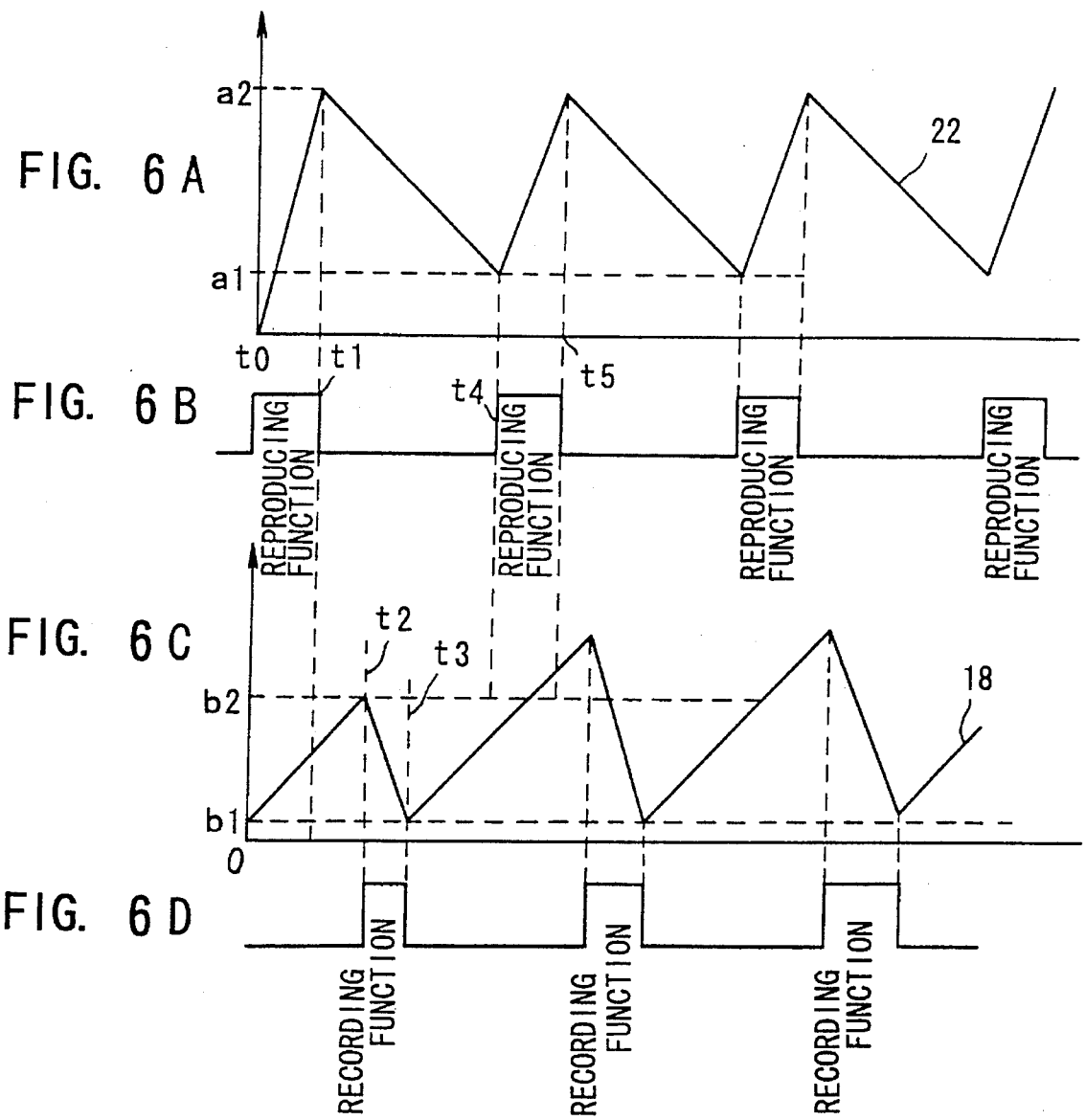

RECORDING/REPRODUCING APPARATUS HAVING BUFFER MEMORY FOR PREVENTING DISCONTINUITY IN RECORDING/REPRODUCING OPERATIONS AND METHOD FOR SAME

This is a divisional of application Ser. No. 08/271,431, filed Jul. 7, 1994 U.S. Pat. No. 5,436,875.

BACKGROUND OF THE INVENTION

1. Field of the Invention

This invention relates to an optical disc device, and more particularly, to a magneto-optical disc device which records and/or reproduces the desired data on the disc shaped recording medium in utilizing the thermal magnetic recording method.

2. Description of the Related Art

Heretofore, in a magneto-optical disc device which is capable of recording and/or reproducing the desired data in utilizing the thermal magnetic recording method, a device has been proposed in U.S. Pat. No. 5,214,631 of May 25, 1993, in which the discontinuity of data can be effectively avoided by outputting the reproduced audio data through a large capacity memory.

This type of optical disc device records the audio data in sector unit consisting of the fixed blocks, and in reproduction, reproduces audio data in this sector unit.

In the case of reproducing the audio data, the optical disc device stores successively reproduced audio data in the memory, while judging whether the audio data is reproduced correctly or not. If the audio data cannot be reproduced correctly, the optical disc device reproduces again in sector unit and rewrites the audio data in the memory.

For example, when the track jump occurs by vibration, etc. in reproducing and the audio data cannot be reproduced correctly, the optical disc device moves an optical pick up to the place where the track jump occurred, and then reproduces and reads the audio data once more to store in the memory.

The optical disc device is capable of reproducing audio data correctly even in the case where the track jump occurs by vibration, etc.

Furthermore, at the time of reproduction, the optical disc device controls the overall function in order that the transmission speed of audio data to be stored in the memory becomes faster than the data transmission speed of audio data to be outputted from the memory. Thus, the optical disc device controls in order that the data having the fixed size is stored in the memory, so that sound break does not occur.

With this arrangement, the data previously stored in the memory is read until the optical pick up returns to the address where the track lump occurred, even when the track lump occurs by vibration, etc., so that the optical disc device can effectively avoid the discontinuity of data, and can reproduce the continuous audio signals.

On the other hand, in recording, the optical disc device processes audio data per sector in utilizing this memory, and simultaneously controls the overall function in order that the transmission speed of audio data to be inputted or outputted to or from the memory becomes the fixed transmission speed.

In recording, if the trouble such as track jump occurs, the optical disc device performs re-write processing, and effectively avoids the trouble in order that the discontinuity of data does not occur on the audio data to be recorded on the optical disc.

Hereupon, in this type of optical disc device, there are devices capable of enjoying singing the desired song accompanied by an orchestra, etc. by reproducing the optical disc device recorded the orchestra accompaniment.

With this arrangement, if the voice sang with the accompaniment can be combined with this accompaniment and recorded on the optical disc, the usability of this type of optical disc device can be further improved.

At this point, if this combined voice can be recorded on the optical disc recorded the accompaniment, the overall construction can be simplified, and thereby considered to be convenient.

This invention has been done considering the above points and is proposing an optical disc device which is capable of recording the desired data as outputting the desired reproduction data simultaneously.

SUMMARY OF THE INVENTION

In view of the foregoing, an object of the invention is to provide a method and apparatus for reproducing data from first and second recording media by turns, comprising the steps of: reproducing data from the first recording medium and storing it in a first storage means;

reading the data from the first storage means;

comparing the amount of data accumulated in the first storage means with a predetermined value and halting the data reading from the first recording medium and simultaneously exchanging the first recording for the second recording medium when the data accumulated in the first storage means reaches the predetermined value; reproducing data from the second recording medium responsive to data input at an external data input means; storing the data reproduced from the second recording medium in the second storage means; and exchanging the second recording medium for the first recording medium.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 6A to 6D are signal waveform charts for the explanation of the function of a memory for reproduction and recording;

DESCRIPTION OF THE PREFERRED EMBODIMENTS

Figure 1:
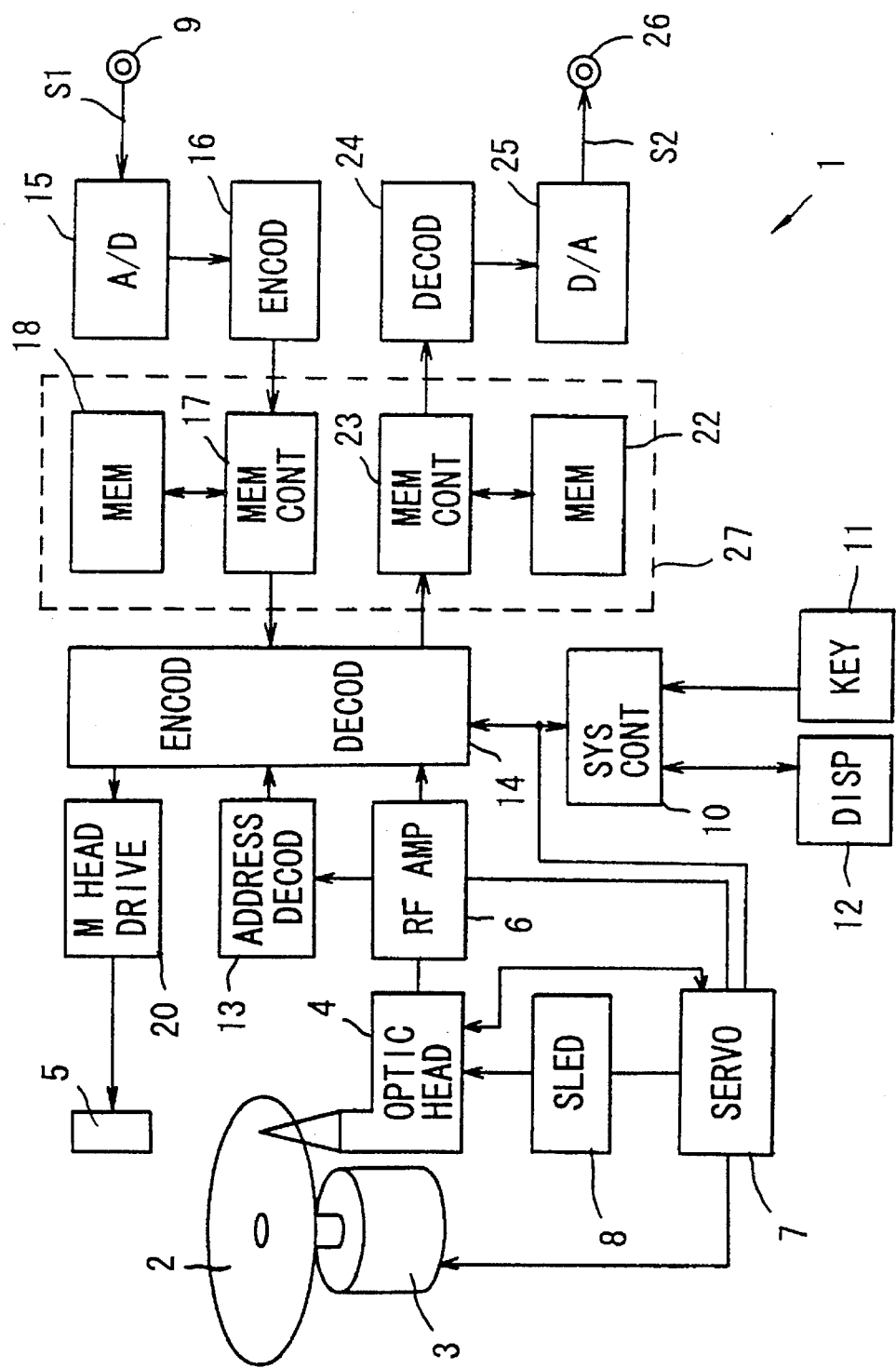
FIG. 1 is a block diagram showing an optical disc device according to one embodiment of this invention.

Preferred embodiments of this invention will be described with reference to the accompanying drawings:

In FIG. 1, 1 generally shows an optical disc device which can reproduce three kinds of optical discs.

More specifically, as the optical disc applying this optical disc device 1, there are optical disc for reproduction only, recordable and reproducible magneto-optical disc and moreover, hybrid optical disc which is recordable and reproducible only for a part of data recording area.

Figure 2:
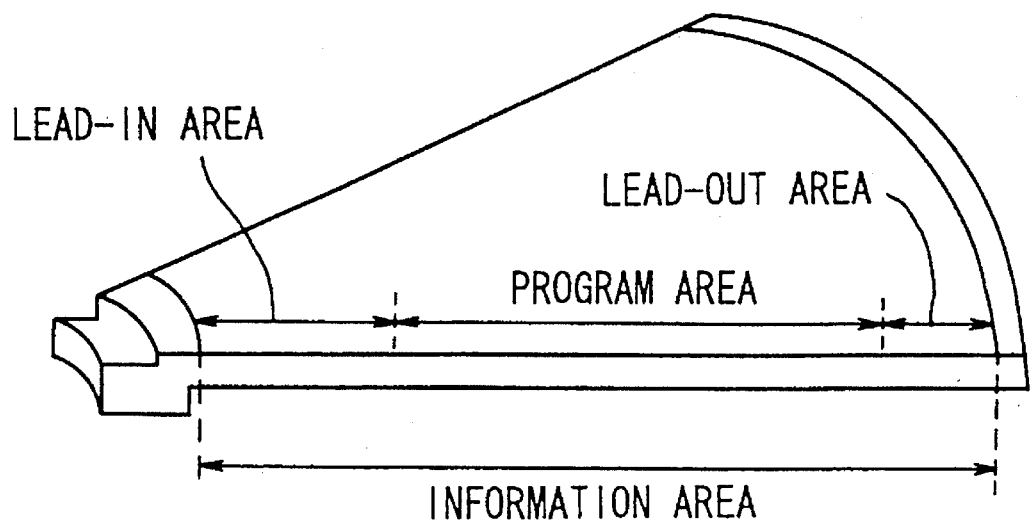
FIG. 2 is a schematic diagram showing an optical disc for reproduction only.

The optical disc for reproduction only is formed by pits similar to those of the compact disc, and as shown in FIG. 2, information area is divided into lead-in area, program area and lead-out area.

In the optical disc for reproduction only, the audio data is previously recorded on this program area, and the TOC (Table of Contents) information which is the control data of this audio data and the control data of the optical disc itself is recorded in the lead-in area.

In the optical disc device, in case of reproducing the optical disc for reproduction only, after control data of lead-in area is reproduced and the program number and recording position, etc. are confirmed, the desired performance can be reproduced depending upon the control data.

Figure 3:
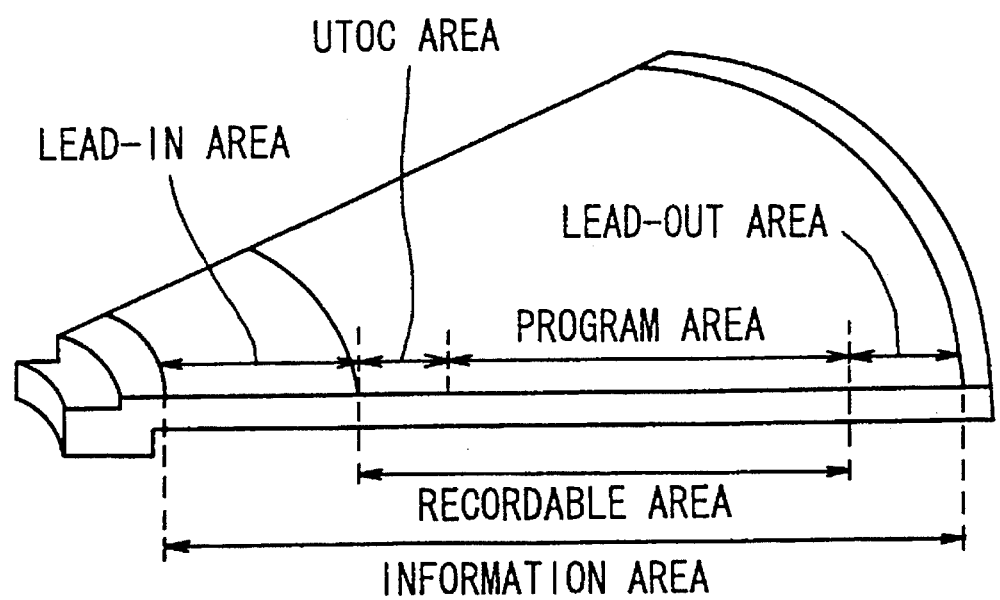
FIG. 3 is a schematic diagram showing a recordable and reproducible optical disc.

On the other hand, as shown in FIG. 3, recordable and/or reproducible optical disc divides information area into lead-in area, recordable area and lead-out area. Pits are formed in the lead-in area and lead-out area upon pre-formatting.

Furthermore, thermal magnetic recordable Pre-groove is previously formed in the recordable area. The recordable area is divided into the U-TOC (User-Table of Contents) area and the program area. The desired data can be thermal magnetic recorded in this program area and the control data of data recorded in this program area (i.e., in the case of audio data, it comprises record starting position data, etc.) can be recorded in the U-TOC area.

On the other hand, this optical disc records the control data of the optical disc itself (i.e., the data representing type of optical disc and the position data of the U-TOC area, etc.) in the lead-in area.

Thus, in the case of recording and reproducing this recordable and reproducible optical disc, after reproducing the control data upon accessing to lead-in area, the optical disc device 1 sets the quantity of light of the optical beam, etc. depending upon this control data and further reproduces the U-TOC area and the control data.

Furthermore, when the optical disc device reproduces the control data of U-TOC area, reproduces program area corresponding to the user's selective operation, and further records the desired audio data in the vacant area of program area and updates the U-TOC area as occasion demands.

Figure 4:
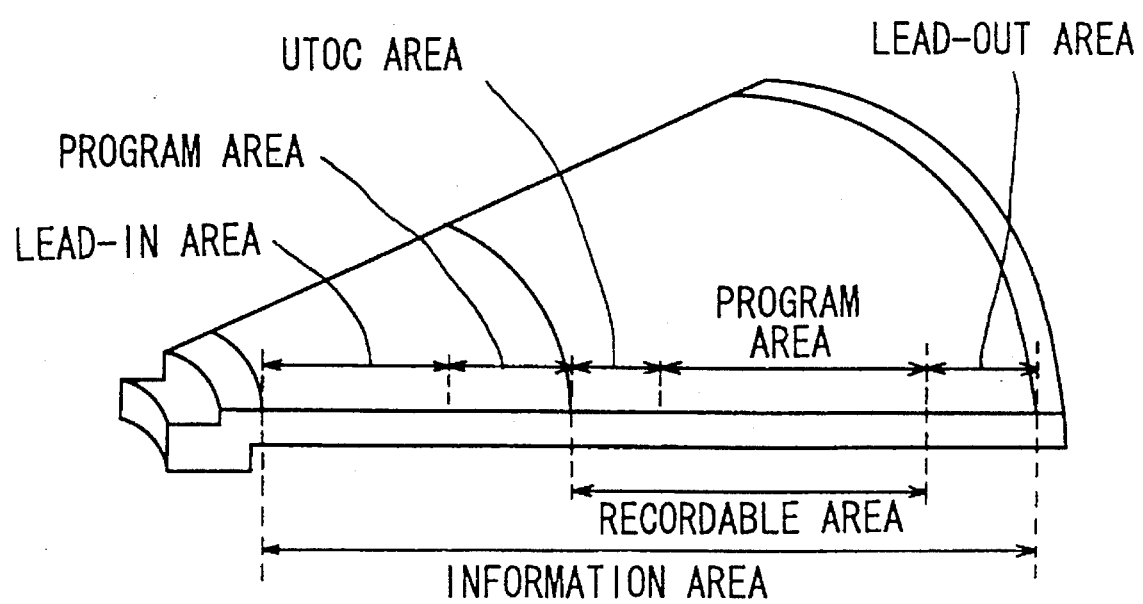
FIG. 4 is a schematic diagram showing a hybrid optical disc.

On the other hand, as shown in FIG. 4, in the hybrid optical disc, the information area is divided into lead-in area, program area, recordable area and lead-out area. Lead-in area, program area and lead-out area are formed by pre-formatted pits similar to an optical disc for reproduction only. Also, thermal magnetic recordable pre-groove is previously formed in recordable area similar to the recordable and reproducible optical disc.

Furthermore, the hybrid optical disc similar to those of the recordable and reproducible optical disc, divides the recordable area into U-TOC area and program area.

The hybrid optical disc assigns and records the audio data for reproduction only in the program area formed after pre-formatted, and the audio data which the user desires can be recorded and reproduced in the program area of recordable area.

Accordingly, when the hybrid optical disc is loaded and the user operates the operation key, the optical disc device 1 shifts the reproducing function to reproduce the audio data from this reproduction only program area and the recording function to record the audio data in the program area of recordable area alternately in the fixed cycle, and thus, while reproducing the optical disc 2, audio signal to be inputted successively can be recorded at the same time.

More specifically, the optical disc device 1 loads the optical disc 2 on a spindle motor 3 and by driving this spindle motor 3 drives the optical disc 2 to rotate under the condition of the constant linear velocity.

Under the above condition, the optical disc device 1 irradiates the optical beam from the optical head 4 and simultaneously impresses the fixed modulated magnetic field on the irradiating position of the optical disc by driving a magnetic head 5, and thus, the desired data can be thermal magnetic recorded on the optical disc 2 by applying the method of thermal magnetic recording.

At this point, the optical disc device 1 receives the reflection light of the optical beam at the optical head 4 and outputs the light receiving result to a servo circuit 7 via a RF amplifier 6.

The servo circuit 7 focus controls and tracking controls the two-axes coil of the optical disc based on the light receiving result, and further drives an optical head 4 by driving a sled motor 8 so as to transfer the optical head 4 to the prescribed recording track, and the audio data can be recorded on the desired area.

At the time of reproduction, the optical disc device 1 decreases the quantity of light of optical beam to be emitted from the optical head 4, and detects the rotating angle of the reflection light of this optical beam in utilizing the Kerr effective, so as to detect the magnetizing direction at the optical head 4.

With this arrangement, the optical disc device 1 can reproduce audio data which is thermal magnetic recorded depending upon the output signal of the optical head 4.

On the other hand, in case of reproducing the reproduction only area, the optical disc device 1 detects the change of light quantity of reflection light at the optical head 4 and thus, the audio data recorded by forming the pit can be reproduced.

At this point, the optical disc device 1 executes the recording and reproducing process by being controlled by a system controller 10.

More specifically, the system controller 10 shifts the overall function by outputting control code corresponding to the operation of a key 11 and displays function mode, etc. on the display device 12 according to demand.

The pre-groove is previously wobbled with the predetermined cycle, and by FM modulating this wobbling, the position information (address) is recorded.

Furthermore, at the time of recording and reproducing, the system controller 10 detects the position information at an address decoder 13 based on the output signal of the optical head 4. The system controller 10 confirms the recording and reproducing position in accordance with the position information, and for example, if errors, such as track jump occurs, controls the overall function to make up for the recording and reproducing data damaged by the error.

In the case of reproducing the reproduction only area, the optical disc device 1 detects the reproducing position information at the address decoder 13 by applying the similar method to those of the compact disc player in place of the pre-groove.

The recording system of the optical disc device 1 being controlled by the system controller 10 inputs audio signal S1 to an analog-to-digital converter (A/D) 15 via an input terminal 9.

An encoder 16 audio compression processes the digital audio signal outputted from the analog-to-digital converter 15 according to the prescribed format and inputs the audio compression processed audio data to a memory 18 via a memory controller 17.

This memory 18 is formed of a large capacity memory which is formed of a random access memory and is capable of storing the audio data for the prescribed period after converting to audio signal S1. The optical disc device 1 records the audio data stored in this memory 18 in the optical disc 2.

At this point, an encoder 16 outputs the audio data at the data transmission speed of 0.3 [Mbit/s] to the memory 18 and the memory 18 outputs the audio data at the data transmission speed of 1.4 [Mbit/s].

With this arrangement, the optical disc device 1 controls the overall function in order that the transmission speed of audio data to be outputted from the memory 18 becomes faster as compared with the transmission speed of audio data to be stored in the memory 18, and furthermore, it stops the recording function temporarily if the audio data stored in the memory 18 becomes below the prescribed value.

Thus, the optical disc device 1 intermittently records the data being continuously inputted in the optical disc 2 in utilizing a large capacity memory as a buffer memory.

Furthermore, the optical disc device 1 stops the recording function immediately at the time when errors, such as track jump, occurs and then returns to the previous recording track and records the audio data again, and thus performs rewrite within the range that a capacity of the memory 18 allows.

Thus, even in the case where errors, such as track jump occurs, the optical disc device 1 is able to start the recording function again without stopping inputting the audio signal S1. Therefore, the track jump is effectively avoided so that continuous audio signal can be recorded.

The audio data outputted from the memory 18 via the memory controller 17 is inputted to an encoder decoder 14 which performs coding process, EFM (Eight Fourteen Modulation) coding, etc. for correcting errors on the audio data and converts the audio data to the prescribed recording signal and outputs this recording signal to a head driving circuit 20.

The head driving circuit 20 drives the magnetic head 5 based on this recording signal and thus, forms the modulated magnetic field at the irradiating position of optical beam corresponding to the recording data.

The optical disc device 1 can thermal magnetic records the desired audio data.

On the other hand, the reproduction system amplifies and outputs the reproducing signal of the optical head 4 at the RF amplifier 6 and the encoder decoder 14 demodulates the reproducing signal to the binary coded data and corrects errors and demodulates the audio data.

The memory 22 is formed of a large capacity memory similar to that of the memory 18, and at the time of reproduction, selectively stores and outputs the audio data reproduced correctly via the memory controller 23 on the output data of the encoder decoder 15.

At this point, whereas the optical disc device 1 stores the audio data intermittently in this memory 22 at the data transmission speed of 1.4 [Mbit/s] by driving the optical head 4 and the encoder decoder 19, the memory 22 outputs the audio data at the data transmission speed of 0.3 [Mbit/s].

With this arrangement, the optical disc device 1 controls the overall function in order that the transmission speed of reproducing data to be inputted to the memory 22 becomes faster than the output data of the memory 22 in the same manner as in the case of recording system; and furthermore, when the volume of data stored in the memory 22 becomes over the prescribed volume, it stops the reproducing function temporarily.

Furthermore, the optical disc device 1 stops reproducing function immediately at the time when errors, such as track jump occurs, and returns to the previous reproducing position and starts reproducing function again in the same manner as those of the recording and read retries within the limits of capacity of the memory 22 allows.

In the optical disc device 1, even in the case where errors, such as track lump occurs, reproducing function can be restarted without interrupting the output of audio signal S2 as same as at the time of recording, and thus, track jump can be effectively avoided and continuous audio signal can be reproduced.

More specifically, at the time of reproduction, a decoder 24 audio expansion processes the audio data and reproduces digital audio signal which is audio compression processed at the time of recording.

A digital-to-analog converter (D/A) 25 forms audio signal S2 by converting digital audio signal to be outputted from the decoder 24 to analog signal and outputs this audio signal S2 from an output terminal 26.

Thus, the optical disc device 1 thermal records the audio signal S1 to be successively inputted on the optical disc 2 at the recording mode, and at the reproducing mode, it can reproduce and output the audio data recorded in the optical disc 2.

Figure 5A:
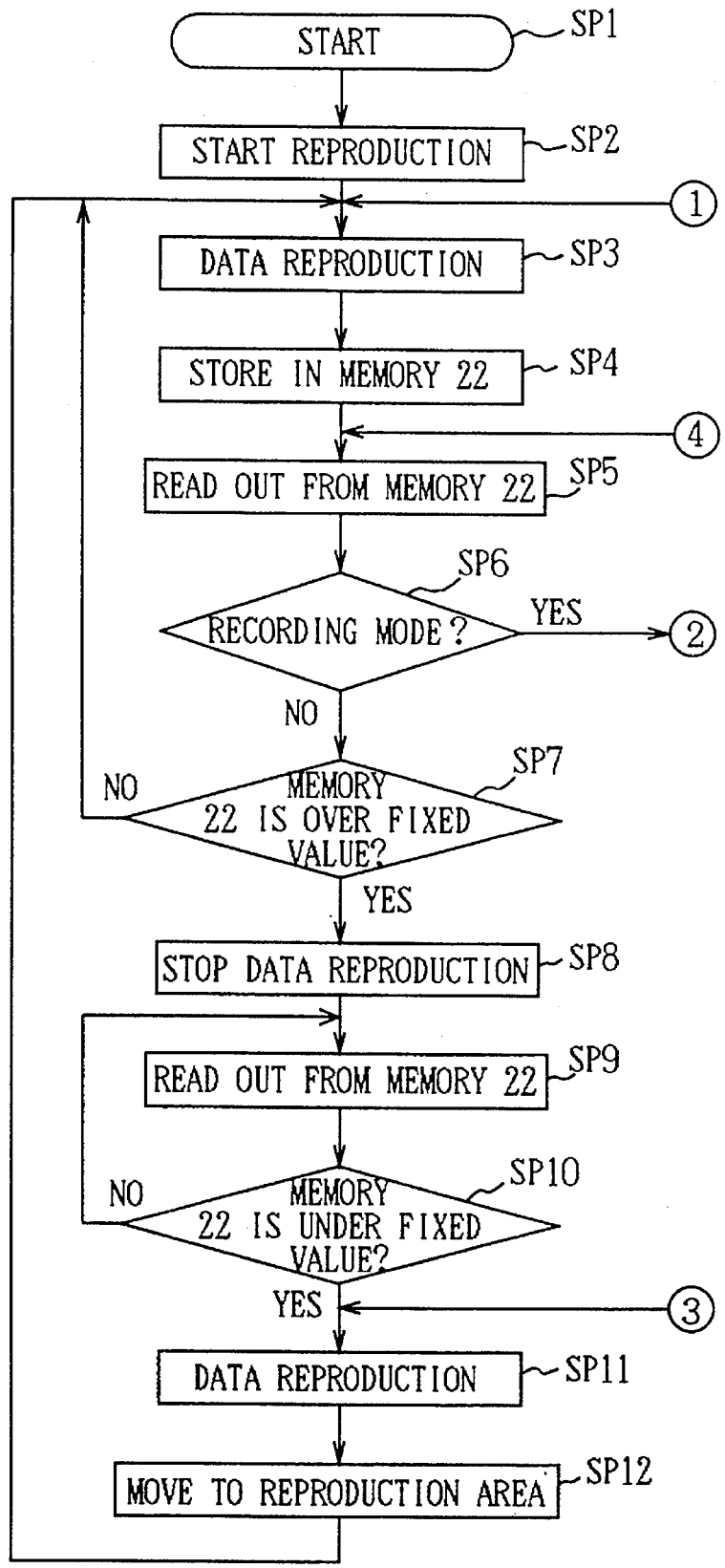
FIGS. 5A and 5B are flow charts for the explanation of the function of an optical disc device.
Figure 5B:
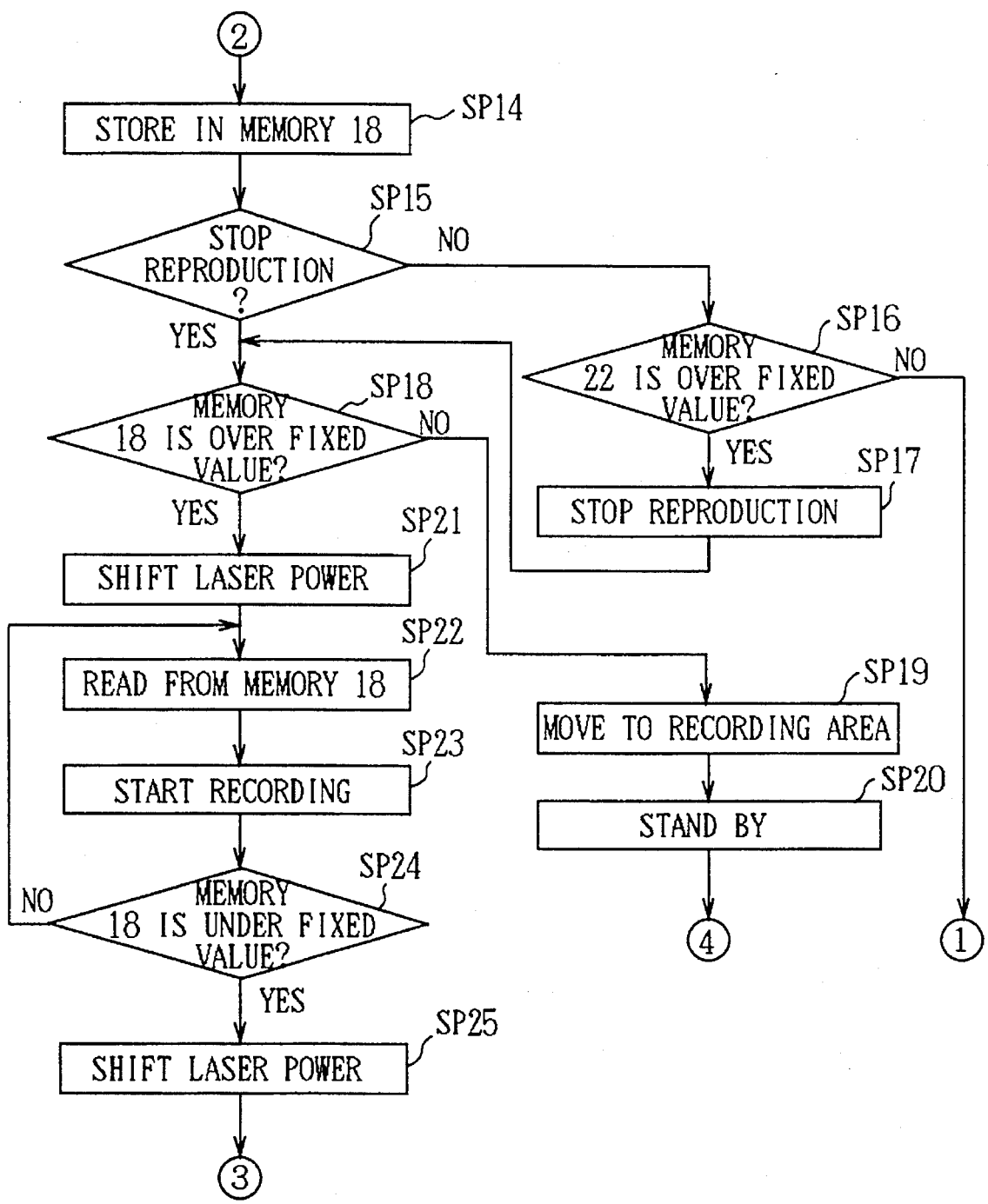

If the user selectively operates the key 11, the system controller 10 performs the processing procedure as shown in FIGS. 5A and 5B and reproduces the optical disc 2; and at this point, if the user selects both the reproducing mode and the recording mode under the condition that the hybrid optical disc 2 is loaded, shifts the overall function in the fixed cycle and thus, reproduces and outputs the audio data recorded on the optical disc 2, and simultaneously, records the audio signal to be inputted successively on the optical disc 2.

When the operation key to start is pressed, the system controller 10 proceeds from the step SP1 to the step SP2 and sends the control code to the servo circuit 7 and thus drives the sled motor 8 and transfers the optical head 4 to the desired recordable recording track.

Then, the system controller 10 proceeds to the step SP3 and here outputs the control code to the servo circuit 7, and after starting the reproduction of audio data by driving the optical head 4 on the performance selected by the user, starts to store the audio data in the memory at the next step SP4.

Then, the system controller 10 proceeds to the step SP5 and outputs the control code to the memory controller 23 and starts to output the audio data from the memory 22 and thus, the optical disc device outputs reproducing signal of the optical disc 2 from the terminal 26.

Accordingly, when the reproduction of audio data is started, the system controller proceeds to step SP6 and judges whether the user also selects the recording mode or not.

At this point, since a negative result is obtained if the user selects only the reproducing mode, the system controller 10 proceeds to the step SP7 and by detecting the data volume of the memory 22, judges whether the audio data exceeding the fixed volume is stored in the memory 22 or not.

Here, the memory 22 inputs and outputs the audio data at the data transmission speed of 1.4 [Mbit/s] and 0.3 [Mbit/s] respectively, and the result is obtained at the step SP7 immediately after the reproduction starts and the system controller 10 returns to the step SP3.

Thus, the system controller 10 performs the processing of step SP3 on the audio data of the following sectors.

With this arrangement, the system controller 10 reproduces the processing steps of SP3-SP4-SP5-SP6-SP7-SP3 repeatedly per sector and outputs the reproduced audio data via the memory 22.

In case of repeating this processing steps, if the system controller 10 detects the abnormality, such as track jump, it stops the reproducing function by issuing the control code to the optical head 4, and by making the optical head 4 to return to the previous reproducing position by driving the sled motor 8, repeats read retry, and thus, the sound break can be effectively avoided.

On the other hand, if an affirmative result is obtained at the step SP7, the system controller 10 proceeds to the step SP8 and stops to drive the optical head 4 and thus, the reproduction of optical disc 2 is stopped.

Then, the system controller 10 proceeds to the step SP9 and reads the audio data of the following sectors from the memory 22 and outputs to the decoder 24, and at the next step SP10, judges whether the data volume of the memory 22 drops below the fixed volume or not.

In this case, when a negative result is obtained, the system controller 10 returns to the step SP9 and outputs the audio data of the following sector to the decoder 24.

With this arrangement, the system controller 10 repeats the processing steps of SP9-SP10-SP9 and stops the reproducing function of the optical disc 2 and outputs the audio data continuously from the memory 22 and the data volume of audio data stored in the memory 22 gradually drops.

Thus, when the system controller 10 repeats the processing steps SP9-SP10-SP9, an affirmative result is obtained at the step SP10, and the system controller 10 proceeds to the step SP11.

At this point, the system controller 10 restarts the optical head 4 by issuing the control code to the servo circuit 7, and then proceeds to the step SP12 and transfers the optical head 4 to the next reproducing area and returns to the step SP3.

Thus, the optical disc device 1 is able to reproduce the continuous audio data by driving the optical head 4 intermittently.

With this arrangement, in the memory 22 for reproducing data, as shown in FIG. 6A, the data volume of audio data changes according to the shifting of reproducing function.

The optical disc device 1 drives the optical head 4 intermittently corresponding to this data volume change and performs the reproducing function (FIG. 6B).

On the other hand, in the case where the user also operates the operation key of recording mode combined, an affirmative result is obtained at the step SP6, and the system controller 10 proceeds to the step SP14.

At this point, the system controller 10 issues the control code to the recording system, such as memory controller 17 and thus, converts audio signal inputted through the terminal 9 at the encoder 16 and starts to store in the memory 18.

Then, the system controller 10 proceeds to the step SP15 and judges whether the reproducing function of audio data from the optical disc 2 is stopped temporarily or not, and if a negative result is obtained at this point, proceeds to the step SP16.

At this point, the system controller 10 judges whether the data volume of the memory 22 increased over the fixed value or not and if a negative result is obtained, returns to the step SP3.

With this arrangement, the system controller 10 repeats the loop of steps SP3-SP4-SP5-SP6-SP14-SP15-SP16-SP3 within the limit that the audio data exceeding the fixed value will not be stored in the memory 22, and thus outputs the reproduced audio data from the terminal 26 for a period from the time point t0 to t1 and simultaneously, stores the audio data to be inputted through the terminal 9 in the memory 18 (FIG. 6C).

On the other hand, if the audio data is stored over the fixed value in the memory 22, a positive result is obtained at the step SP16, and the system controller 10 proceeds to the step SP17 and performs the processing similar to that of the step SP8 and step SP9 described above and after stopping the reproducing function, proceeds to the step SP18.

At this point, the system controller judges whether the audio data of over the fixed value is stored or not, and if a negative result is obtained, proceeds to the step SP19.

At this point, the system controller 10 transfers the optical head 4 to the unrecorded area of recordable area by driving the sled motor 8, and at after shifting the recording system to the condition for standing by the recording at the step SP20, returns to the step SP5.

Then, the system controller 10 performs the processing procedure of steps SP5-SP6-SP14-SP15 and when an affirmative result is obtained at the step SP15, the system controller 10 proceeds to the step SP18.

With this arrangement, the system controller performs the processing procedure of steps SP19-SP20 and returns to the step SP5, and repeats the processing procedure of steps SP5-SP6-SP14-SP15-SP18-SP19-SP20 until the audio data of over the fixed value is stored in the memory 18.

Thus, in the optical disc device 1, the recording and reproducing function for the optical disc 2 is stopped for a period of time from the time point t1 till the time point t2, over the fixed value audio data is stored in the memory 18. The optical head 4 is controlled to the condition for standing by within the recordable read.

Then, the audio data stored in the memory 22 is outputted and simultaneously, the audio data inputted successively is stored in the memory 18.

Accordingly, if the above processing procedure is repeated, the data volume of the memory 18 increases over the fixed value, and the system controller 10 obtains an affirmative result at the step SP18 and proceeds to the step SP21.

At this point, the system controller 10 issues the control code to the servo circuit 7, and by rising the optical head 4 to the recording mode, shifts the quantity of light of the optical beam to the quantity of light at the time of recording. At the next step SP22, audio data stored in the memory 18 is outputted to the encoder decoder 14.

Then the system controller 10 proceeds to the step SP23 and issues the control code to the recording system, and starts recording the audio data and proceeds to the step SP24.

At this point, the system controller 10 judges whether the data volume of memory 18 decreased below the fixed value or not, and in this case, a negative result is obtained, returns to the step SP22.

With this arrangement, the system controller 10 repeats the processing procedure of steps SP22-SP23-SP24-SP22 when the data volume of the memory 18 becomes over the fixed value at the time point t2 on the condition that the recording and reproducing functions for the optical disc 2 stop, and thus records audio data of the memory 18 on the optical disc 2.

Furthermore, since an affirmative result is obtained at the step SP24 when the data volume of the memory 18 becomes below the fixed value after repeating the above processing procedure, the system controller 10 switches the laser power to the power in reproducing at step SP25, and returns to the step SP11.

With this arrangement, the system controller 10 records audio data of the memory 18 on the optical disc 2 during a period of time from the time point t2 to the time point t3 at which the data volume of the memory 18 falls below the fixed value (FIG. 6D), and when the data volume of the memory 18 becomes below the fixed value, repeats the processing procedure of steps SP3-SP4-SP5-SP6-SP7-SP3.

The optical disc device 1 repeats recording and reproducing functions alternately for the optical disc 2 in utilizing memories 18 and 22 as the buffer memory and is capable of recording and reproducing continuous audio signal thus effectively avoiding the track jump.

In case of repeating these recording and reproducing functions alternately, the optical disc device 1 selects capacities of memories 18 and 22 to the capacity sufficiently large enough and simultaneously, selects the data volume b2 of the memory 18, which is shifted to the recording function at first, to the fixed value. Thus, the sound break is effectively avoided and the recording and reproducing functions is repeated alternately having the prescribed standing by time between.

The optical disc device 1 selects the timing of recording and reproducing functions in order that the optical disc 2 does not perform the recording and reproducing functions at the same time, and furthermore, in utilizing the prescribed waiting time, can seek the optical head 4 between the reproducing position and the recording position.

Furthermore, at this point, the optical disc device 1 can perform the recording and reproducing functions in utilizing memories 18 and 22 provided in order to effectively avoid the discontinuation of data caused by track jump, etc., thereby enabling the overall function to simplify.

Also, by repeating the recording and reproducing processing alternately, the construction from the optical head 4 to the encoder decoder 14 can be constructed with one system so that the general construction can be simplified.

Figure 7:
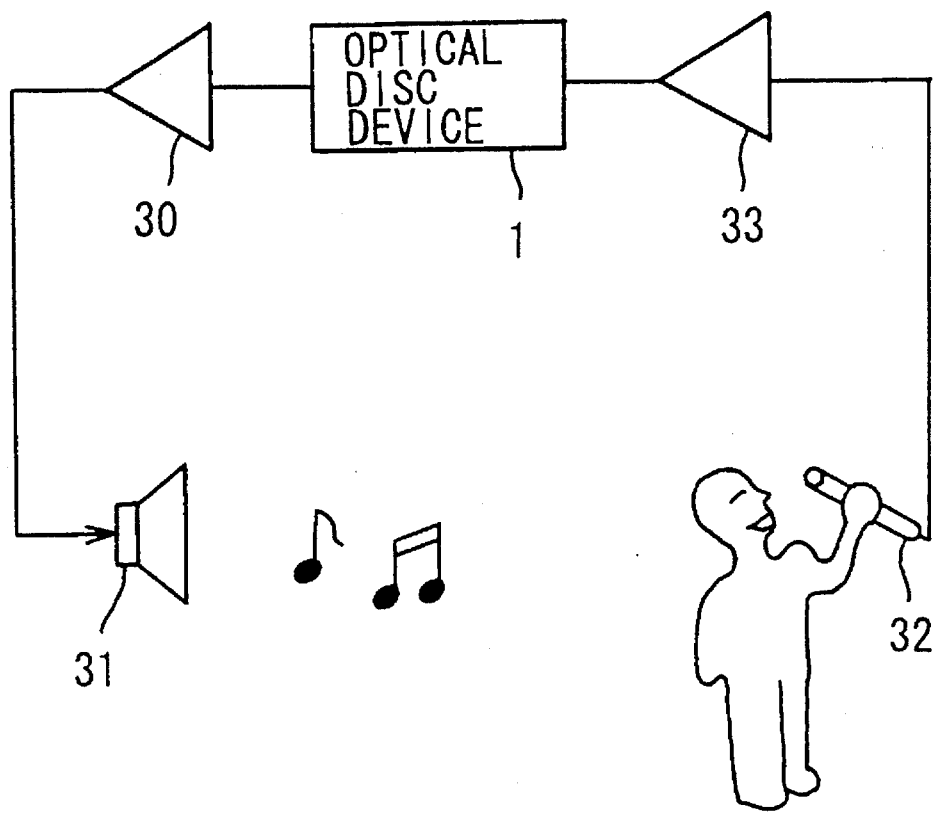
FIG. 7 is a schematic diagram showing the practical application.

Thus, as shown in FIG. 7, in the optical disc device 1, by repeating the so-called self recording and reproducing function, the audio signal uttered by the user can be recorded on the optical disc 2 with the accompaniment while listening to the accompaniment.

In this case, the accompaniment recorded in the reproduction only area of the optical disc 2 is reproduced at the optical disc device 1 and the reproduction output is amplified at an amplifier 30 and outputted from a speaker 31. Furthermore, voice signal inputted from a mike 32 is amplified at an amplifier 33 and combined with the reproduction output and inputted to the input terminal 9 of the optical disc device, thereby recording in the recording area on the optical disc 2. Therefore, the audio signal, which has been recorded in the area for reproduction only on the optical disc 2, can be recorded in the recording area of the optical disc 2 with voice signal.

On the other hand, even when the reproducing function starts still in a state of recording after about thirty minutes has been elapsed since the recording of radio broadcasting is started, the contents of the recording program can be listened from the beginning although the recorded program has not been completed, and thus, it can be used as so-called time shifting machine.

In the above embodiment, the input terminal 9 is connected through the line-out terminal of external device, such as a radio, from the external, so as to input the audio data.

According to the foregoing construction, the audio data is recorded and reproduced by shifting the transmission speed via the memory with a large capacity, and by repeating the recording and reproducing functions alternately, continuous audio signal is inputted and recorded on the optical disc while continuously outputting the reproduction result of a piece of optical disc.

Figure 8:
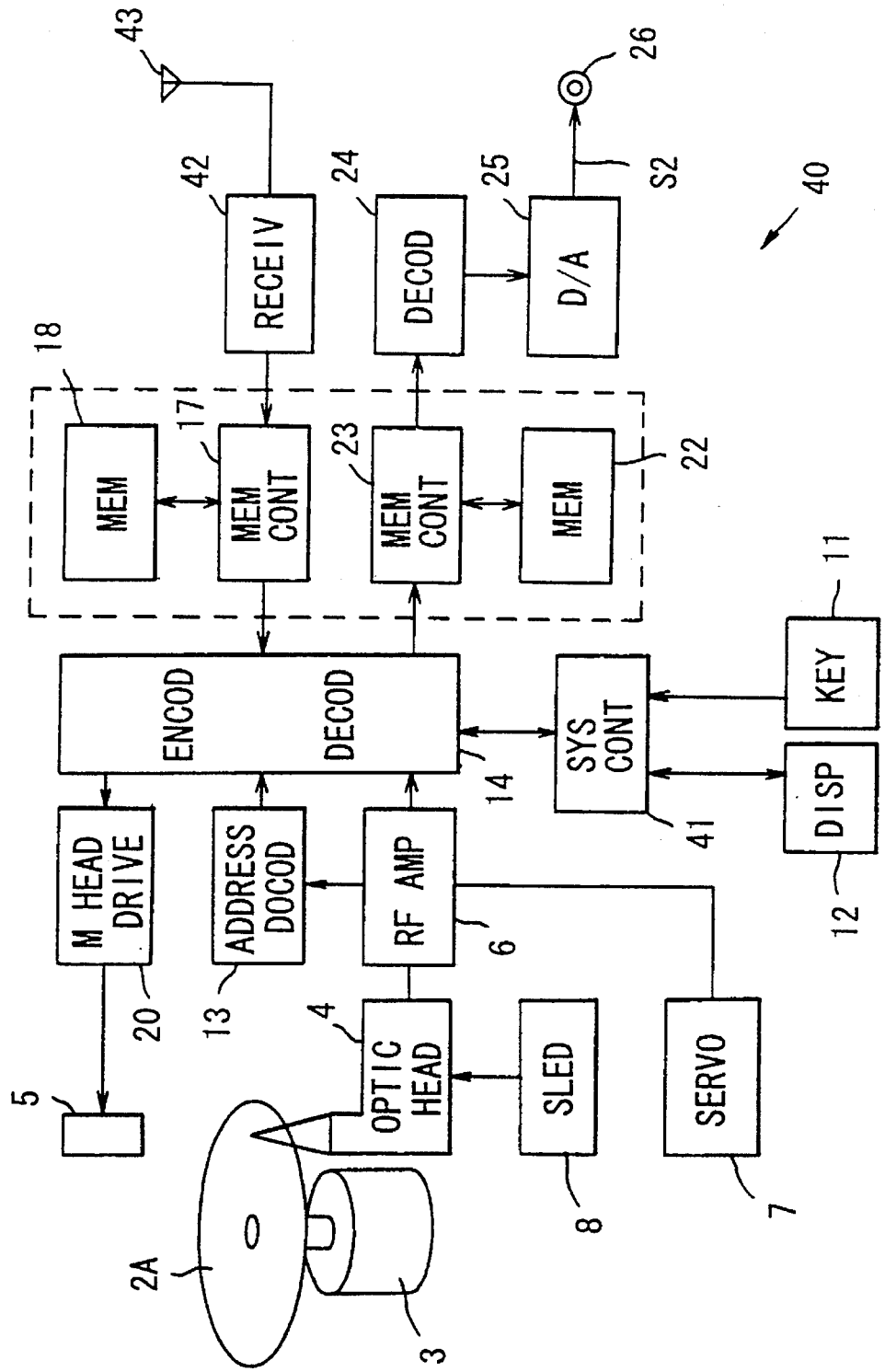
FIG. 8 is a block diagram showing an optical disc device according to the second embodiment.

The second embodiment is shown in FIG. 8.

In FIG. 8, an optical disc device 40 records the position information detected at a receiver 42 on the prescribed optical disc.

More specifically, the optical disc device 40 forms the audio appliance for the vehicle and the receiver 42 receives the prescribed standard signal outputted from a plurality of man-made satellites via an antenna 43, and detects the present position depending upon the received result.

Furthermore, the receiver 42 outputs the position information comprising the detection result of present position with time information to show the position detected time in the fixed cycle, and the optical disc device 40 compresses the information data to store in the memory 18.

Figure 9:
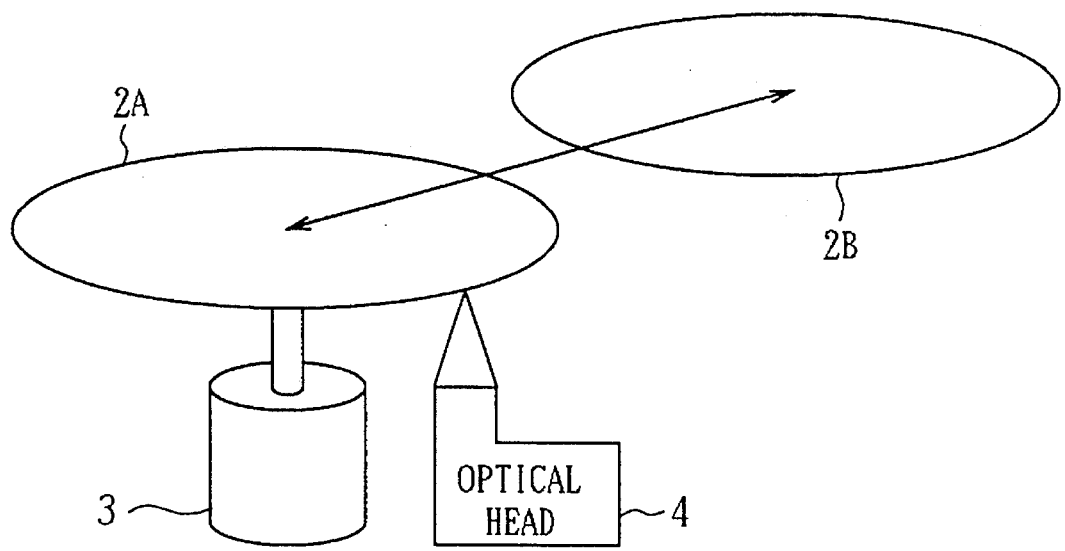
FIG. 9 is a schematic diagram showing the exchange of optical discs.

On the other hand, as shown in FIG. 9, the optical disc device 1 stores and holds two optical discs 2A and 2B in the prescribed cartridge and attaches the optical disc 2A selected by the user to the spindle motor 3 to make it recordable and reproducible, and the optical disc 2A is formed of the reproduction only optical disc on which audio signal is recorded, and the optical disc 2B is formed of recordable and reproducible optical disc which can record the position information.

The optical disc device 1 controls the overall function at the system controller 41 and in the case where the user selects the reproduction only optical disc 2A on which audio signal is recorded, reproduces this optical disc 2A corresponding to the user's operation, and outputs the resulting audio signal from the terminal 26.

And thus, in the optical disc device 1, audio signal of the optical disc 2A can be listened through the prescribed audio appliance.

Figure 10:
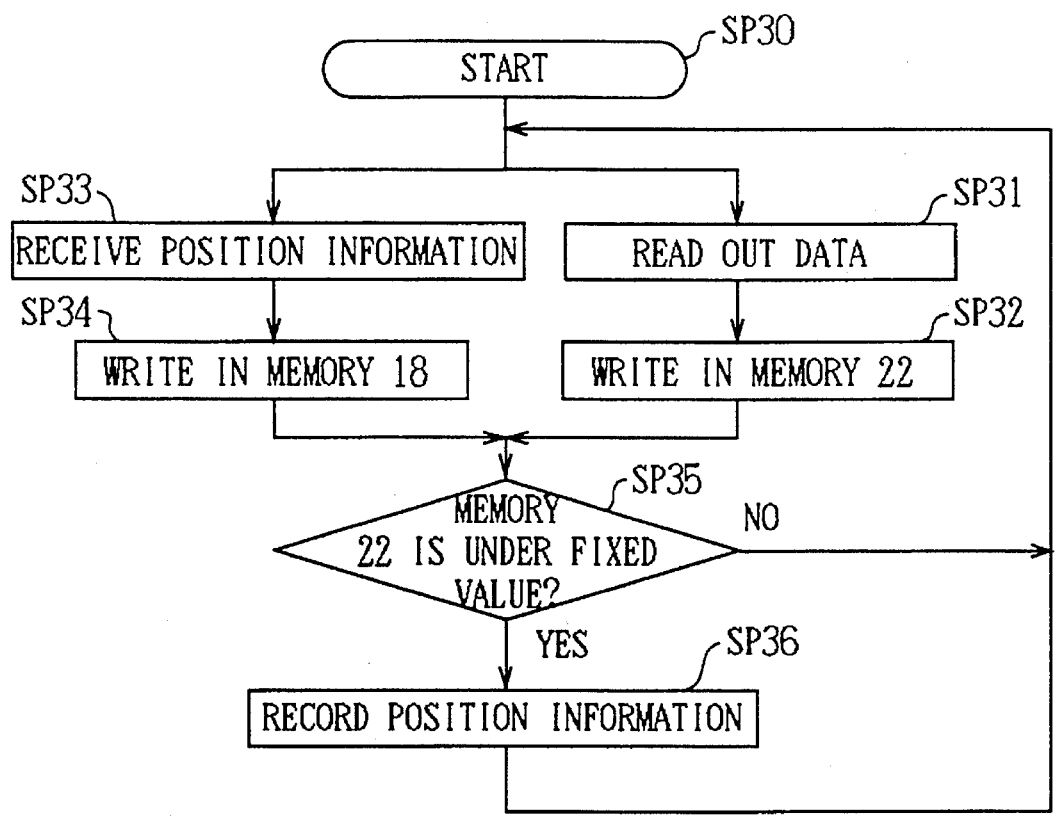
FIG. 10 is a flow chart for the explanation of its function.

On the other hand, in the case where the user assigns to reproduce this optical disc 2A by operating the prescribed key, and simultaneously assigns to record the position information, the system controller 41, by executing the processing procedure as shown in FIG. 10, outputs audio signal of the optical disc 2A and simultaneously, records the position information on the recordable and reproducible optical disc 2B.

More specifically, the system controller 41 proceeds from the step SP30 to the step SP31 and here, sends the control code to the reproducing system and starts reproducing the optical disc 2A and stores the resulting audio data in the memory 22 at the following step SP32.

At the same time, the system controller 41 proceeds from the step SP30 to the step SP33 and at the time when the position information is detected by controlling the receiver 42, records this position information on the memory 18 at the next step SP34 and proceeds to the step SP35.

At this point, the system controller 41 judges whether the data volume of the memory 22 becomes under the fixed value or not, and if a negative result is obtained here, returns to the step SP31 and SP33.

The optical disc device 1 stores the audio data which is enough for the audio signal to be outputted from the terminal 26 does not break off during a period of time, after exchanging the optical disc 2A for the optical disc 2B and recording the position information stored in the memory 18 on the optical disc 2B, till the reproduction of optical disc 2A starts again after exchanging the optical disc 2B for the optical disc 2A. Here, if audio data is sufficiently stored, an affirmative result is obtained at the step SP35, and then the system controller 41 proceeds to the step SP36.

Accordingly, the system controller 41 stops the reproducing function at the step SP36 and after exchanging the optical disc 2A for 2B, records the position information stored in the memory 18 on the optical disc 2B.

Furthermore, when recording of the position information is completed, the system controller 41 chocks the previous optical disc 2A to the spindle motor 3, and then, returns to steps SP31 and SP33 and repeats the processing procedure.

According to the construction shown in FIG. 7, by recording the position information in place of audio signal, the position information can be recorded on the different optical disc while continuously reproducing the audio signal.

Next, other embodiments will be described hereinafter.

Figure 11:
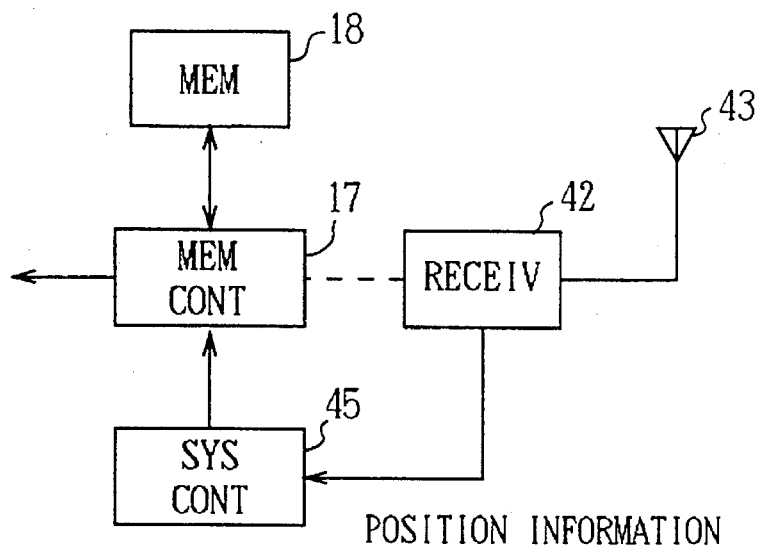
FIG. 11 is a block diagram showing a part of the optical disc device according to the other embodiment to FIG. 8.

Furthermore, the second embodiment has dealt with the case of inputting directly the position information to be outputted from the receiver 42 to the memory 18 via the memory controller 17. However, the present invention is not only limited to the above, but also it may be inputted via the system controller 45 as shown in FIG. 11.

Figure 12:
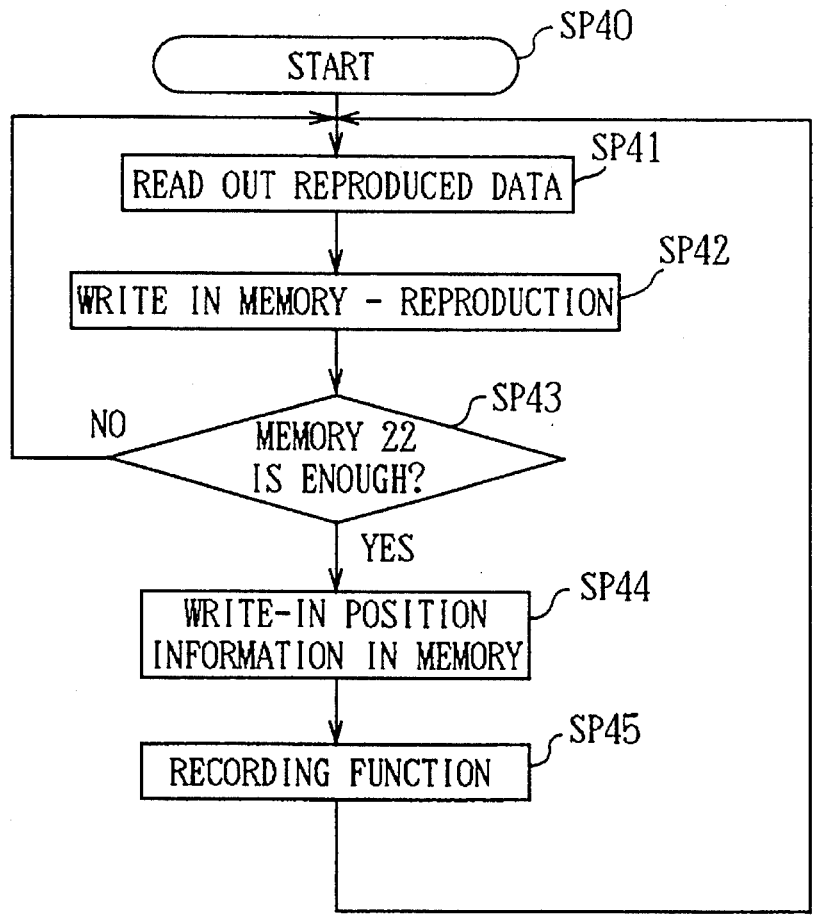
FIG. 12 is a flow chart for the explanation of its function.

In this case, as shown in FIG. 12, the system controller 45 proceeds from the step SP40 to the step SP41, and reproduces audio data from the optical disc 2A and at the next step SP42, outputs the audio data from the memory 22 while storing the audio data in the memory 22.

Furthermore, the system controller 45 judges whether the data volume of the memory 22 is over the fixed value or not at the following step SP43, and at this point, if a negative result is obtained, returns to the step SP41. On the other hand, if an affirmative result is obtained at the step SP43, the system controller 45 proceeds to the step SP44 and stores the position information inputted from the receiver 42 in the memory 18.

Moreover, at the next step SP45, the system controller 45 chocks the optical disc 2B to the spindle motor 3 in place of the optical disc 2A and records the position information of the memory 18 on the optical disc 2B, and then, chocks the optical disc 2A to the spindle motor 3 again and returns to the step SP41.

Accordingly, if the position information is inputted through the system controller 41, the same effect as those of the second embodiment can be obtained.

The second embodiment described above has dealt with the case of recording the position information on the optical disc 2B while outputting audio signal continuously. However, the present invention is not only limited to the above but also the position information may be recorded corresponding to the map information on the other optical disc while outputting continuously the map information recorded on the optical disc in the form of video signal.

Also, the embodiment discussed above have dealt with the case of combining the optical disc 2A being an optical disc for reproduction only on which the audio data has been recorded and the optical disc 2B being a recordable and reproducible optical disc on which the position information can be recorded. However, this invention is not limited to this but it can be applicable to the combination of the optical disc 2A being an optical disc for reproduction only on which the audio signal has been recorded and the optical disc 2B being an optical disc for reproduction only on which the position information for navigation has been recorded.

Figure 13:
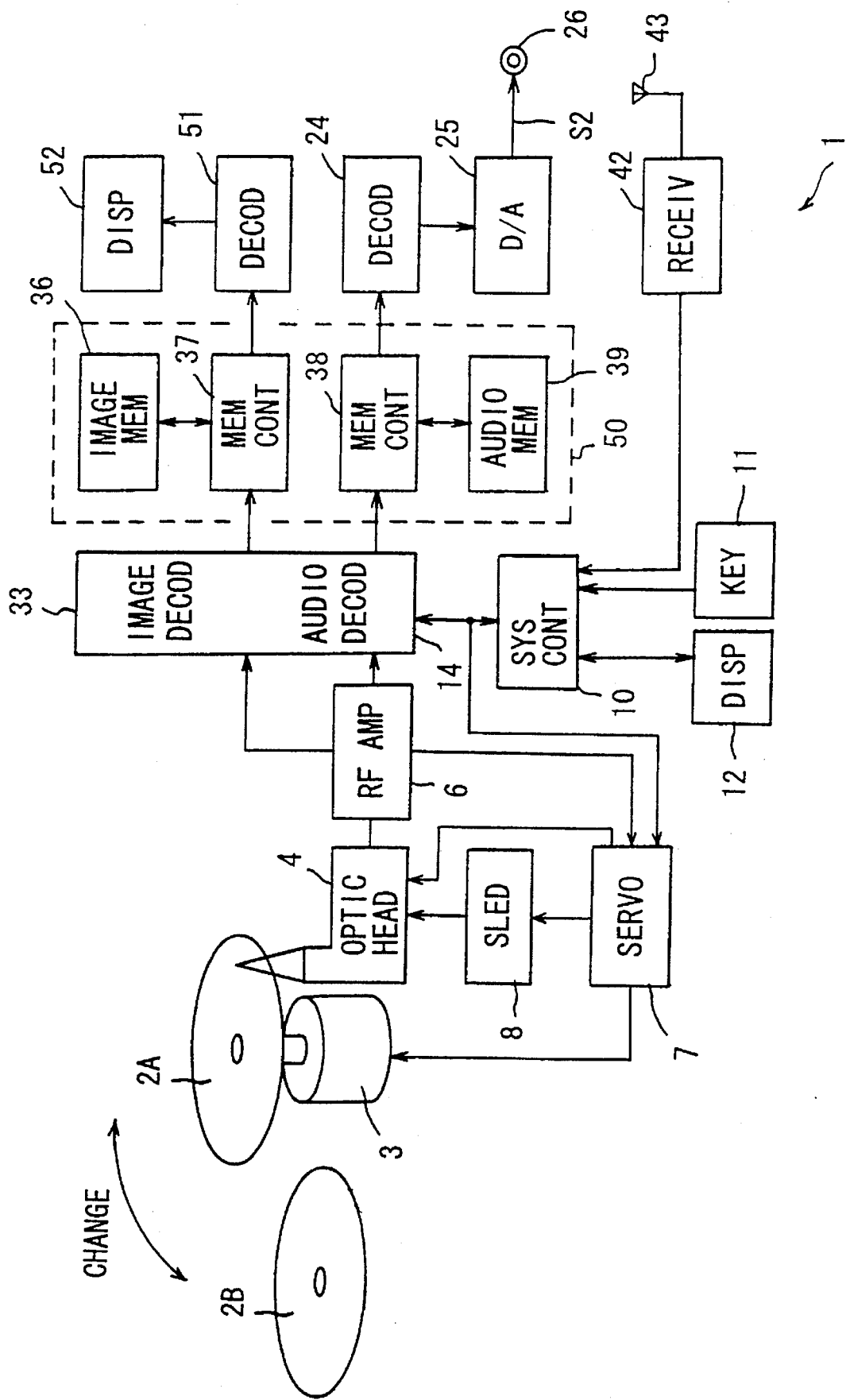
FIG. 13 is a block diagram showing an optical disc device according to the third embodiment.

This third embodiment will be described referring to FIGS. 13 and 14. Here, the blocks corresponding to those of FIG. 1 are designated with the same number.

Figure 14:
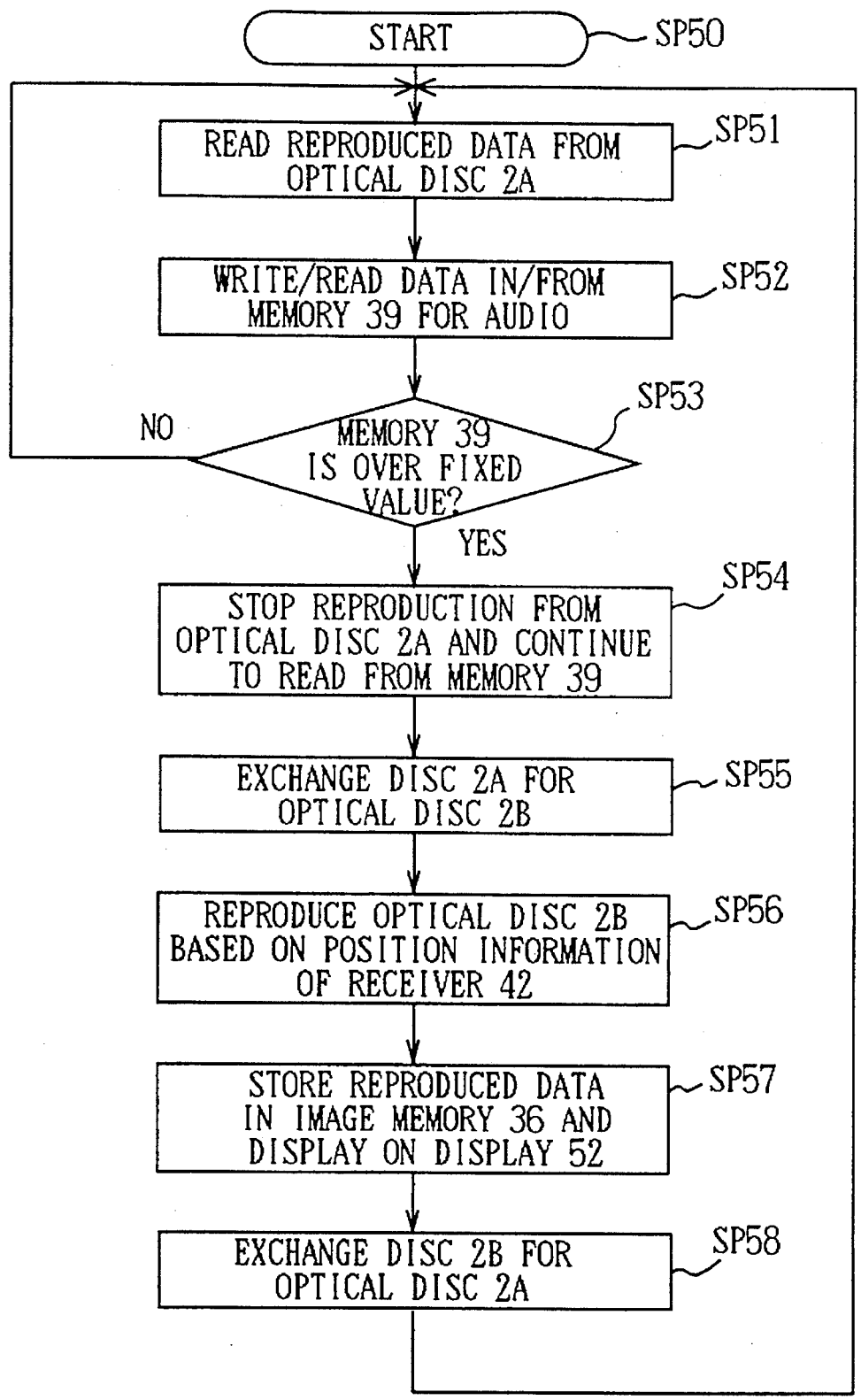
FIG. 14 is a flow chart for the explanation of its function.

In FIG. 14, at first, the reproduction signal is reproduced from the optical disc 2A for reproduction only on which the audio information has been recorded by using the optical head 4 (SP51) and then stored in a memory for audio 39 (SP52).

When the cumulated amount in the memory for audio 39 is over the predetermined value, the optical pick up 4 is controlled to halt the reproduction, and the optical disc 2A is exchanged for the optical disc 2B for navigation (SP53-SP54-SP55).

As the optical disc 2B is loaded in the reproduction position, the map information corresponding to the position information, which is taken from the receiver 42, is read out so as to perform image process on the information at the image decoder 33, and then taken into the image memory 36 via the memory controller 37 (SP56-SP57). At the same time, the processed map information is displayed on the display 52.

After the image information is displayed, the reproduction of the optical disc 2B is halted and the optical disc 2 is exchanged for the optical disc 2A so as to start the reproduction from the data continuing from the last data written in the memory for audio 39 on the optical disc 2A (SP58-SP51).

Here, it is assumed that the predetermined value is over the cumulated amount which is enough for total time, total time being the time for exchanging the optical disc (the time that the time for exchanging the optical disc 2A for the optical disc 2B and the time for exchanging the optical disc 2B for the optical disc 2A are added) and the time for accessing to the predetermined reproduction position (the time that the time from the starting of reproduction to access to the reproduction position corresponding to the position information taken from the receiver 42 and the time from the starting of reproduction to access to the reproduction position corresponding to the last data taken in the memory for audio 39 are added).

Figure 15:
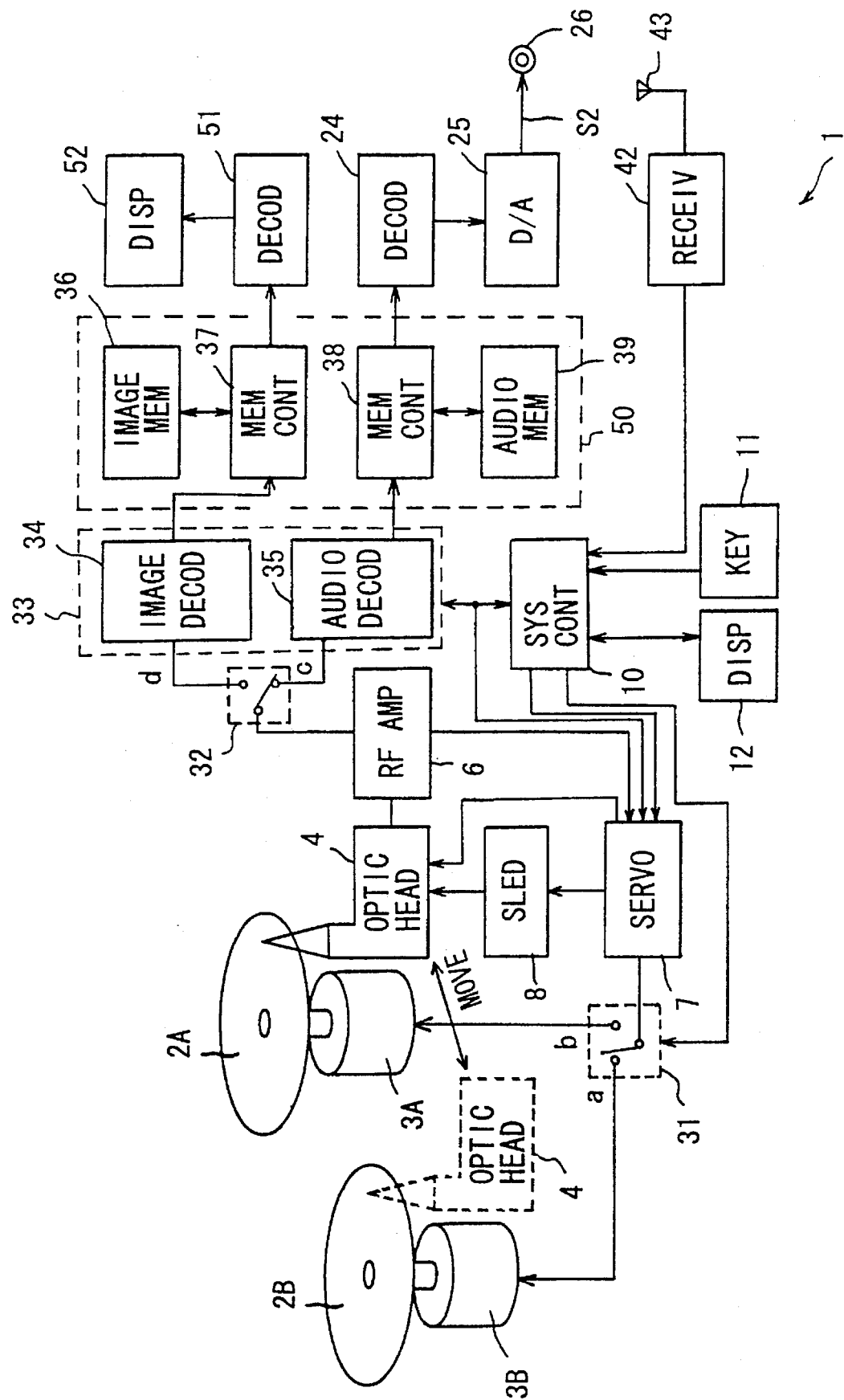
FIG. 15 is a block diagram showing an optical disc device according to the other embodiment to FIG. 13.
Figure 16:
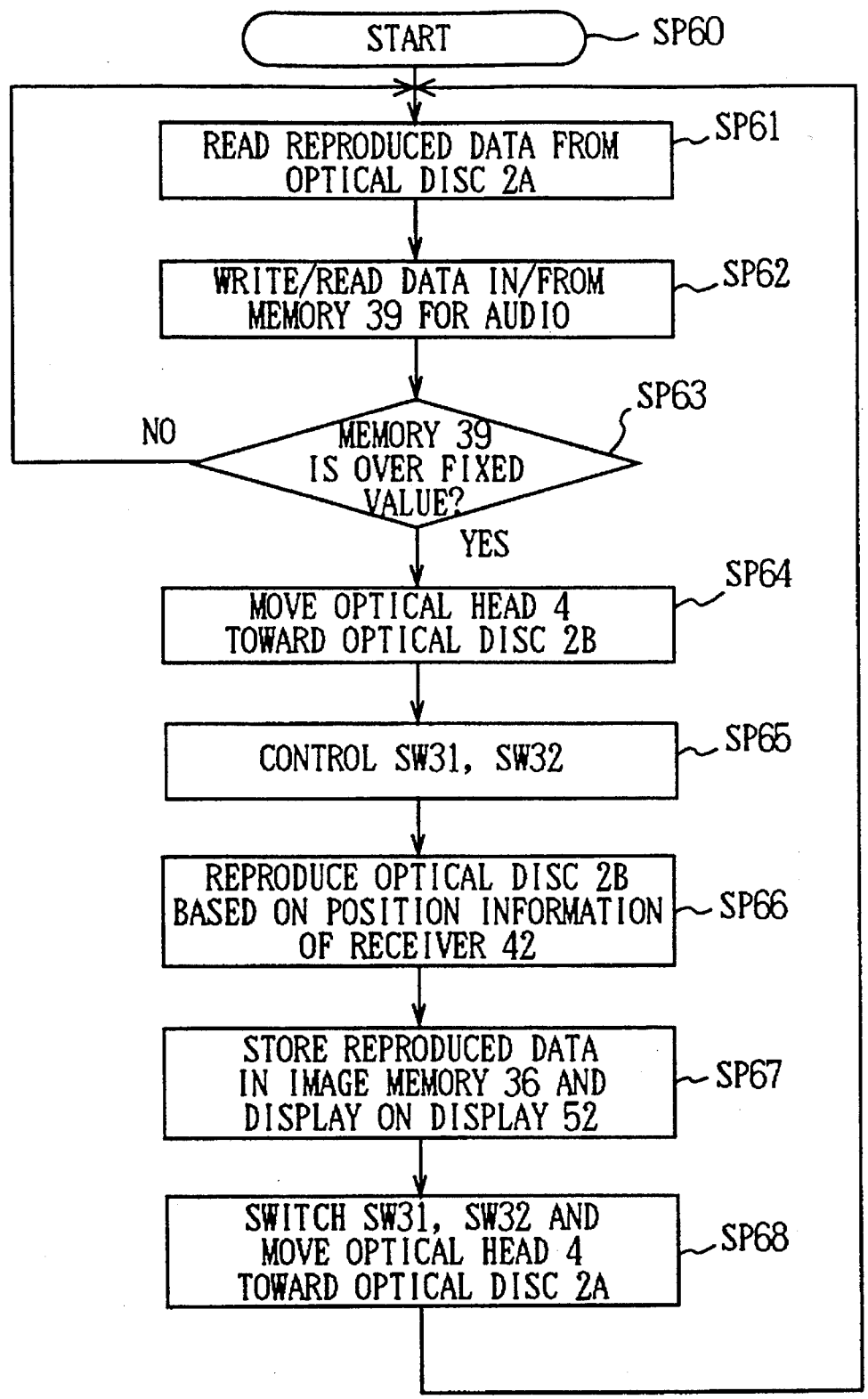
FIG. 16 is a flow chart for the explanation of its function.

As the application of the third embodiment, an example will be described, in which, as Shown in FIG. 15, two spindle motors (3A, 3B) for rotating discs are provided, so that the optical head 4 is moved by a sled to allow both of the optical discs 2A, 2B to reproduce. Therefore, the time for exchanging can be shorten.

At first, the reproduction signal is reproduced from the optical disc 2A for reproduction only on which the audio information has been recorded by using the optical head 4 (SP61), and the reproduction signal is stored in the memory for audio 39 (SP62).

When the cumulated amount in the memory for audio 39 is over the predetermined value, the sled motor is driven and the optical head 4 is moved so as to reproduce the optical disc 2B for navigation (SP63-SP64).

In the condition that the optical disc 2B is reproducible, the system controller 10 sends the switch signal so as to change the switch 31 from "a" to "b" and the switch 32 from "c" to "d" (SP65).

Then, the map information corresponding to the position information taken from the receiver 42 is read out and image processed at the image decoder 33, and is taken into the image memory 36 via the memory controller 37 (SP66-SP67).

At the same time, the map information image processed is displayed on the display 52.

After the image information is displayed, the reproduction of the optical disc 2B is halted and the optical head 4 is moved and controlled so as to reproduce the optical disc 2A by using the sled motor, and simultaneously, the system controller 10 sends the switch signal to change the switch 31 from "b" to "a" and the switch 32 "d" to "c" (SP68).

Then, the optical disc 2A is driven again to start the reproduction from the data continuing from the data written in the memory for audio 39 on the optical disc 2A.

Here, the predetermined value needs only the time for moving the optical head 4 back and forth between the optical disc 2A and the optical disc 2B and the time for start the reproduction, so that the amount for storing in the memory can be reduced for the exchanging time of disc, and therefore, a large capacity of memory is not necessary and it can comprise cheaper.

Furthermore, the embodiment described above has dealt with the case of recording the prescribed data on the optical disc while outputting the continuous reproduction result in utilizing the memory for avoiding track jump effectively. However, the present invention is not only limited to the above but the function to avoid track jump can be omitted.

Moreover, the embodiment described above has dealt with the case of applying three kinds of optical discs to the optical disc device to be reproduced. However, the present invention is not only limited to the above but also widely applicable to various optical disc devices.

Further, the embodiment described above has dealt with the case where the optical disc 2A is a disc for audio only and the optical disc 2B is a disc for navigation. However, this invention is not only limited to the above but the optical disc 2A can be a disc for audio only and the optical disc 2B can be a disc for image.

What is claimed is:

1. A reproducing method for reproducing data from a first recording medium and a second recording medium by turns, comprising the steps of:

reproducing data from the first recording medium;

storing said reproduced data in a first storage means;

reading data from said first storage means;

comparing an amount of data accumulated in said first storage means with a predetermined value;

halting the data reading from said first recording medium, and simultaneously exchanging the first recording medium for the second recording medium, when the data accumulated in said first storage means reaches the predetermined value;

reproducing data from said second recording medium responsive to data input at an external data input means;

storing the data reproduced from said second recording medium in a second storage means; and exchanging said second recording medium for said first recording medium.

2. The reproducing method according to claim 1, wherein:

said first storage means and said second storage means are used in common.

3. The reproducing method according to claim 1, wherein:

said first and said second recording medium are disc type recording medium.

4. The reproducing method according to claim 1, wherein:

the data inputted from said external data input means is position information.

5. The reproducing method according to claim 1, wherein:

said first recording medium is a recording medium in which an audio signal has been recorded, and said second recording medium is a recording medium in which map information has been recorded.

6. The reproducing method according to claim 1, wherein:

said step of exchanging the first recording medium for said second recording medium comprises moving said reproducing means between said first recording medium and said second recording medium.

7. The reproducing method according to claim 1, wherein:

said step of exchanging the first recording medium for said second recording medium comprises moving said reproducing means between said first recording medium and said second recording medium.

8. The reproducing method according to claim 1, wherein:

the predetermined value is larger than the sum of the time required to exchange the recording mediums and the time required to drive reproduction.

9. The reproducing method according to claim 6, wherein:

the predetermined value is larger than the sum of the time required to move the reproducing means between the first recording medium and the second recording medium and the time required to drive reproduction.

10. The reproducing method according to claim 1 wherein said step of reproducing data from the first recording medium comprises reproducing data at a first rate and said step of reading data from said first storage means comprises reading said data at a second rate slower than said first data rate.

11. An apparatus for reproducing data from first and second recording media by turns, comprising:

reproducing means for reproducing data from said first recording medium;

first storage means for storing the reproduced data from said first recording medium;

first memory control means for writing the reproduced data from said reproducing means into said first storage means at a first rate and reading the data stored in said first storage means at a second rate slower than said first rate;

second storage means for storing data from a second recording medium;

second memory control means for writing the data from said second recording medium into said second storage means at a third rated and reading said data stored in second storage means at a fourth rate slower than said third rate;

comparing means for comparing an amount of data accumulated in first storage means with a predetermined value;

third control means for halting the reproducing from said first recording medium and commencing the reproducing from said second medium when said data accumulated in said first storage means reaches said predetermined value.

12. The reproducing apparatus according to claim 11, wherein said first and second recording media are disk type recording media.

13. The reproducing apparatus according to claim 11, wherein said reproducing means comprises an optical pickup.

14. The reproducing apparatus according to claim 11, wherein said first recording medium is a recording medium in which an audio signal has been recorded and said second recording medium is a recording medium in which map information has been recorded.

15. The reproducing apparatus according to claim 11, wherein said third control means comprises means for moving said reproducing means between said first and second recording media.

16. The reproducing apparatus according to claim 11, wherein said predetermined value corresponds to a number of memory spaces in said first storage means for which the time required to read said data out of said number of storage spaces at said second rate is greater than the sum of the time required to exchange the recording media and the time required to drive reproduction.

17. The reproducing apparatus according to claim 15, wherein said predetermined value corresponds to a number of memory spaces in said first storage means for which the time required to read said data out of said number of storage spaces at said second rate is greater than the sum of the time required to move the reproducing means between the first and second recording media and the time required to drive reproduction.

\* \* \* \* \*

UNITED STATES PATENT AND TRADEMARK OFFICE
CERTIFICATE OF CORRECTION

PATENT NO. : 5,566,144
DATED : October 15, 1996
INVENTOR(S) : AKIRA SHINADA

It is certified that error appears in the above-indentified patent and that said Letters Patent is hereby corrected as shown below:

In Col. 15, line 5, delete "rated" and replace with --rate,--.

Signed and Sealed this

Seventh Day of January, 1997

Attest:

BRUCE LEHMAN

*Attesting Officer*     *Commissioner of Patents and Trademarks*